(12) United States Patent
Cho et al.

(10) Patent No.: US 11,379,689 B2
(45) Date of Patent: Jul. 5, 2022

(54) TECHNOLOGY FOR ANALYZING ABNORMAL BEHAVIOR USING DEEP LEARNING-BASED SYSTEM AND DATA IMAGING

(71) Applicant: CTILAB CO., LTD., Seoul (KR)

(72) Inventors: Hong Yeon Cho, Suwon-si (KR); Tae Yang Oh, Guri-si (KR); Won Woo Park, Seongnam-si (KR)

(73) Assignee: CTILAB CO., LTD., Seoul (KR)

( * ) Notice: Subject to any disclaimer, the term of this patent is extended or adjusted under 35 U.S.C. 154(b) by 324 days.

(21) Appl. No.: 16/644,424

(22) PCT Filed: Feb. 12, 2018

(86) PCT No.: PCT/KR2018/001841
§ 371 (c)(1),
(2) Date: Mar. 4, 2020

(87) PCT Pub. No.: WO2019/050108
PCT Pub. Date: Mar. 14, 2019

(65) Prior Publication Data
US 2021/0064926 A1    Mar. 4, 2021

(30) Foreign Application Priority Data
Sep. 6, 2017    (KR) ........................ 10-2017-0114054

(51) Int. Cl.
*G06K 9/62* (2022.01)
*G06K 9/00* (2022.01)
(Continued)

(52) U.S. Cl.
CPC ....... *G06K 9/6256* (2013.01); *G06K 9/00496* (2013.01); *G06N 3/08* (2013.01); *G10L 25/18* (2013.01)

(58) Field of Classification Search
CPC ............. G06K 9/6256; G06K 9/00496; G06K 9/6271; G06K 9/627; G06N 3/08;
(Continued)

(56) References Cited

U.S. PATENT DOCUMENTS

2016/0142424 A1*    5/2016    Barak ................. H04L 63/1416
726/24

FOREIGN PATENT DOCUMENTS

JP       2015-026252 A      2/2015
KR    10-2004-0093743 A    11/2004
(Continued)

OTHER PUBLICATIONS

International Search Report for PCT/KR2018/001841 dated Jun. 15, 2018 from Korean Intellectual Property Office.

*Primary Examiner* — Charlotte M Baker
(74) *Attorney, Agent, or Firm* — Paratus Law Group, PLLC

(57) ABSTRACT

Disclosed is a method of analyzing abnormal behavior by using data imaging, including: receiving data to be analyzed as an input, wherein the data to be analyzed is related to a state of a system to be analyzed; converting the inputted data to be analyzed into image data; training a neural network unit with the converted image data as an input; and detecting or predicting abnormal behavior in the system to be analyzed, at the neural network unit, which has received the image data converted from the data to be analyzed as the input and completed training.

12 Claims, 9 Drawing Sheets

(51) Int. Cl.
*G06N 3/08* (2006.01)
*G10L 25/18* (2013.01)

(58) Field of Classification Search
CPC ........... G06N 3/04; G10L 25/18; G10L 25/30;
G10L 25/51; G06V 10/464; G06V 10/82;
G06T 2207/20081; G06T 2207/20084
USPC ............................................ 382/157; 726/24
See application file for complete search history.

(56) References Cited

FOREIGN PATENT DOCUMENTS

| KR | 10-2015-0013416 A | 2/2015 |
| KR | 10-2016-0074022 A | 6/2016 |
| KR | 10-2016-0148911 A | 12/2016 |

* cited by examiner

| PA1:VH | PM1:V | PA2:VH | PM2:V | PA3:VH | PM3:V |
|---|---|---|---|---|---|
| 73.733 | 130305 | −46.254 | 130280 | −166.23 | 130381 |
| 74.083 | 130581 | −45.899 | 130558 | −165.88 | 130656 |
| 74.553 | 131083 | −45.424 | 131057 | −165.42 | 131158 |
| 74.547 | 131057 | −45.441 | 131032 | −165.44 | 131133 |
| 74.536 | 131007 | −45.456 | 131007 | −165.45 | 131083 |
| 74.501 | 130882 | −45.475 | 130957 | −165.47 | 131057 |

< Row-wise Clustering >

< K-NN Clustering >

FIG. 2
Prior Art
| PA1:VH | PM1:V | PA2:VH | PM2:V | PA3:VH | PM3:V |
|---|---|---|---|---|---|
| 73.733 | 130305 | −46.254 | 130280 | −166.23 | 130381 |
| 74.083 | 130581 | −45.899 | 130558 | −165.88 | 130656 |
| 74.553 | 131083 | −45.424 | 131057 | −165.42 | 131158 |
| 74.547 | 131057 | −45.441 | 131032 | −165.44 | 131133 |
| 74.536 | 131007 | −45.456 | 131007 | −165.45 | 131083 |
| 74.501 | 130882 | −45.475 | 130957 | −165.47 | 131057 |
< Column-wise Processing >
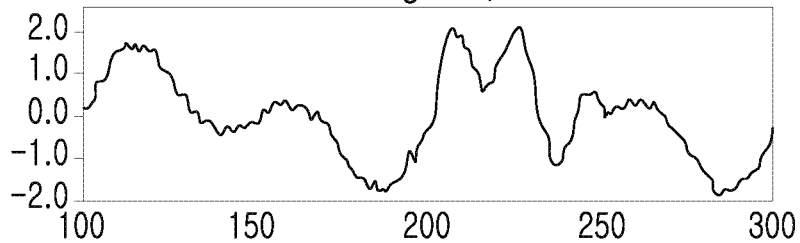
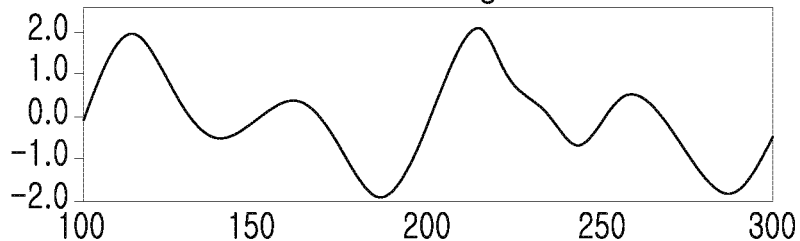
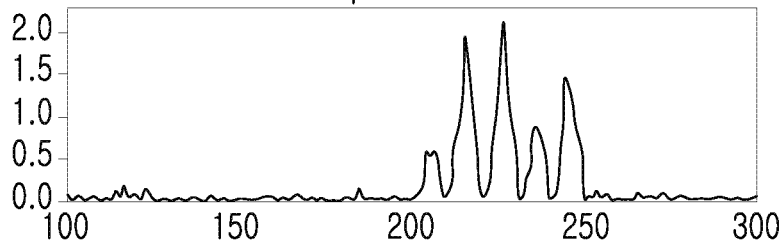
< Column-wise LSTM anomaly >

FIG. 3

Prior Art

Master/Slave protocol
ISO/OSI mapping:

| ISO/OSI Model |
|---|
| Application |
| Presentation |
| Session |
| Transport |
| Network |
| Data Link |
| Physical |

DNP 3

| | protocol area that cannot be analyzed due to unpublicized specifications |
|---|---|
| IEC-1815 DNP3 Specific | |
| TCP / UDP | |
| IP | |
| Data Link | |
| Multiple (e.g.:Ethernet) | |

FIG. 7
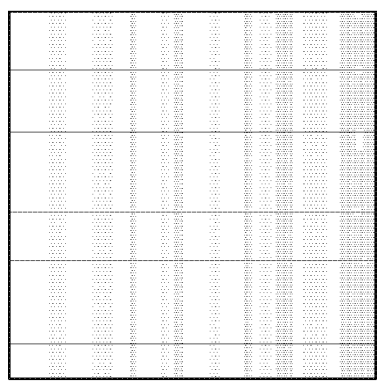
(a)
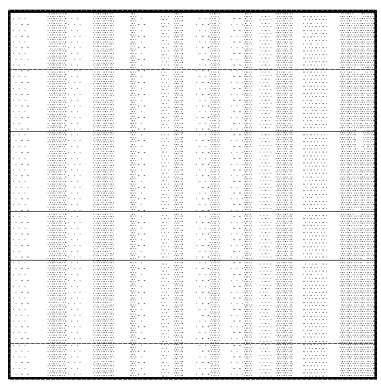
(b)
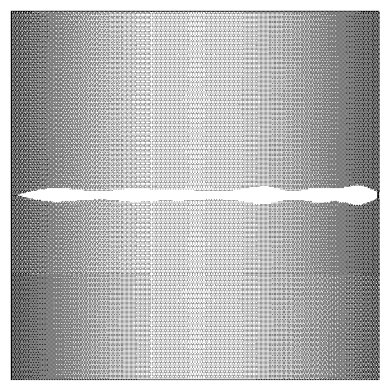
(c)
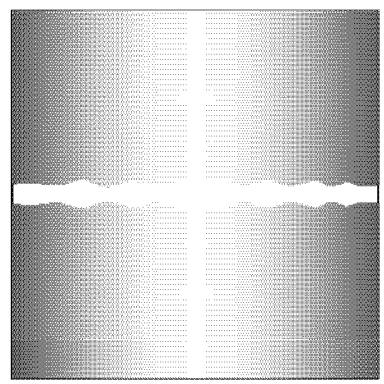
(d)

TECHNOLOGY FOR ANALYZING ABNORMAL BEHAVIOR USING DEEP LEARNING-BASED SYSTEM AND DATA IMAGING

CROSS-REFERENCE TO PRIOR APPLICATIONS

This application is a National Stage Patent Application of PCT International Patent Application No. PCT/KR2018/001841 (filed on Feb. 12, 2018) under 35 U.S.C. § 371, which claims priority to Korean Patent Application No. 10-2017-0114054 (filed on Sep. 6, 2017), which are all hereby incorporated by reference in their entirety.

BACKGROUND

The present invention relates to a technology for analyzing abnormal behavior, and more particularly, to a technology for analyzing abnormal behavior using a deep learning-based system and data imaging.

Recently, there have been continued efforts to detect, in real time, abnormal behavior and other patterns in a system to be analyzed (e.g., various systems including network systems, measurement systems, control systems, and so on), by analyzing single-channel or multi-channel data from said system as packet data.

A related method of analyzing abnormal behavior using statistical machine learning techniques will be described with reference to FIGS. 1 and 2.

As illustrated in FIG. 1, when data analysis is performed with the K-NN clustering method through row-wise clustering, multi-channel static analysis using features of multi-channel signals is possible. However, there is a problem in which past information of time-series data may not be utilized.

Meanwhile, as illustrated in FIG. 2, when data analysis is performed with the 'column-wise long short term memory (LSTM) anomaly' through column-wise processing, past information can be utilized in the analysis. However, there is a problem that comprehensive multivariate analysis and prediction are impossible by the utilizing the features of composite, multi-channel signals.

Meanwhile, as illustrated in FIG. 3, in the related art, specifications corresponding to application/presentation/session layers have not been publicized in the ISO/OSI model, and thus, protocol areas that cannot be analyzed.

SUMMARY

Accordingly, it is an object of the present invention to provide a technology of classifying and recognizing abnormal behavior in a system to be analyzed, by generating image data related to the state of said system and then performing deep-learning-based image recognition.

In order to solve the technical problems mentioned above, a method of analyzing abnormal behavior using data imaging according to the present invention may include a step of receiving data to be analyzed as an input, in which the data to be analyzed is related to a state of a system to be analyzed; a step of converting the inputted data to be analyzed into image data; a step of training a neural network unit with the converted image data as an input, and at the neural network unit, which has received the image data converted from the data to be analyzed as input and completed training; a step of detecting or predicting abnormal behavior in the system to be analyzed.

The data to be analyzed may be multi-channel packet data inputted from multiple channels.

The step of converting the inputted data to be analyzed into image data may include dividing the multi-channel packet data into a predetermined size and arranging the same in a two-dimensional array, splitting the multi-channel packet data arranged in the two-dimensional array into a predetermined unit, and converting the split multi-channel packet data into grayscale image data.

The split multi-channel packet data may have the same number of columns and rows as the number of channels.

The predetermined size may be a byte.

The step of converting the inputted data to be analyzed into image data may additionally include Fourier-transforming the grayscale image data to generate Fourier image data.

The data to be analyzed may be single channel packet data.

The step of preprocessing the inputted data to be analyzed may include converting the single channel packet data into an audio file, and converting the converted audio file into spectrogram image data.

The neural network unit may be trained and may perform classification of the image data converted from the data to be analyzed, by using a neural network algorithm applied with a deep learning technique.

In order to solve the technical problems mentioned above, a system for analyzing abnormal behavior using data imaging according to the present invention may include an input unit that receives data to be analyzed as an input, in which the data to be analyzed is related to a state of a system to be analyzed; a data processing unit that converts the inputted data to be analyzed into image data; and a neural network unit that receives the converted image data for training and, after completing the training, receives the image data converted from the data to be analyzed to detect abnormal behavior in the system to be analyzed.

According to the present invention, it is possible to classify and recognize abnormal behavior in the system to be analyzed, by generating image data from the data to be analyzed that is related to the state of the system to be analyzed, and then performing deep learning-based image recognition.

Particularly, packet data encrypted with a protocol having unpublicized specifications can be imaged and analyzed without being decrypted. In addition, a multivariate analysis of multi-channels and past information of temporal data sequence are utilized together so as to enable comprehensive classification and prediction.

BRIEF DESCRIPTION OF THE DRAWINGS

FIGS. 1 and 2 are diagrams provided to explain a related method of detecting and predicting abnormal behavior in a system.

FIG. 3 shows protocol areas having unpublicized specifications and thus cannot be analyzed.

FIG. 7 is a diagram provided to compare grayscale image data and Fourier-transformed image data according to the first embodiment of the present invention.

DETAILED DESCRIPTION

Hereinafter, preferred embodiments of the present invention will be described in detail with reference to the accompanying drawings so that those with ordinary knowledge in the art may easily achieve the present invention.

Figure 1:
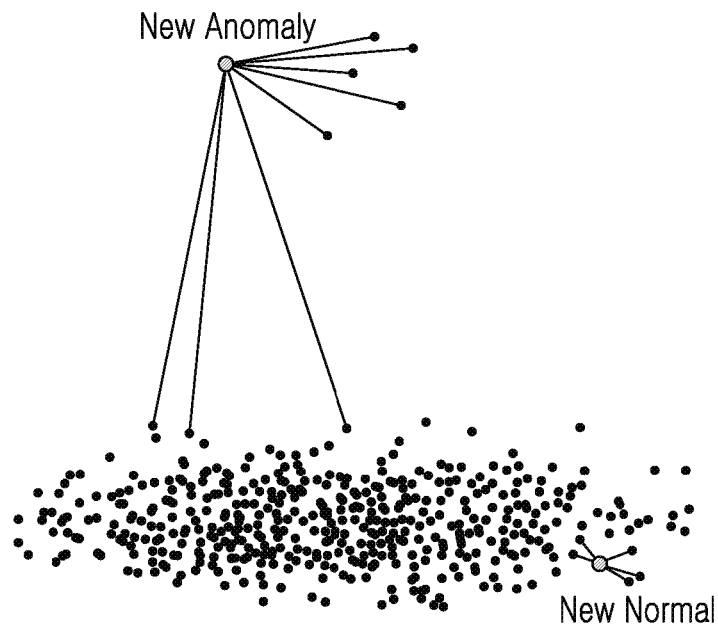
Figure 4:
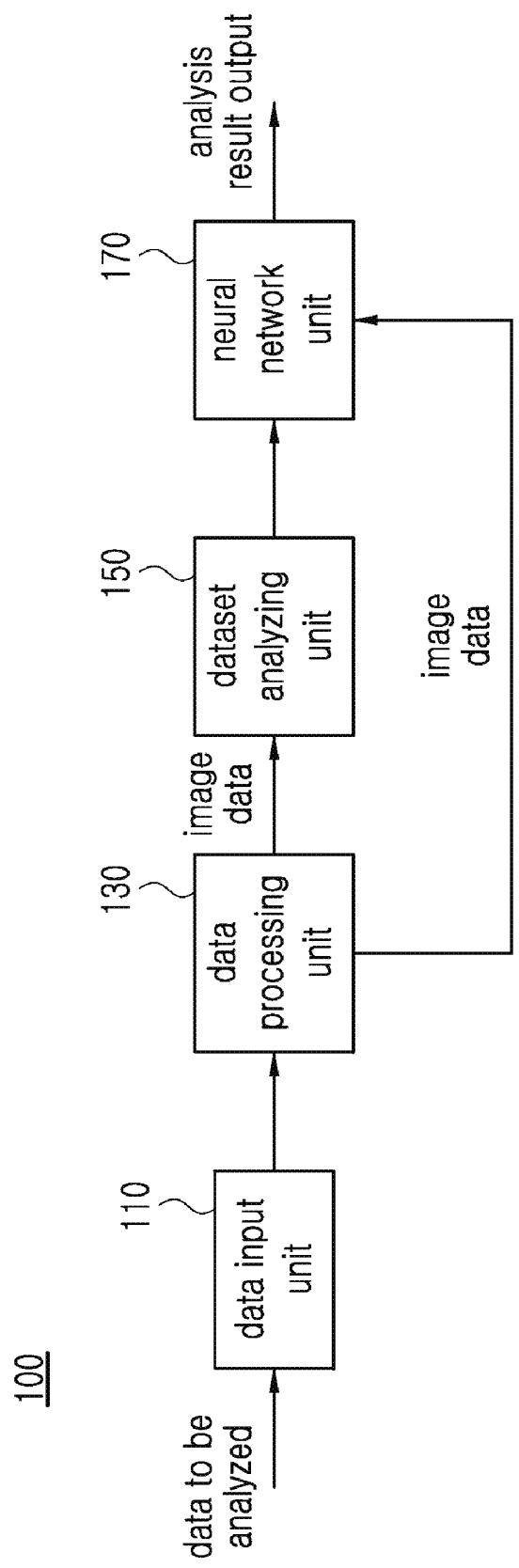
FIG. 4 is a block diagram illustrating a configuration of a system for analyzing abnormal behavior using data imaging according to an embodiment of the present invention.

FIG. 4 is a block diagram illustrating a configuration of a system for analyzing abnormal behavior using data imaging according to the first embodiment of the present invention.

Referring to FIG. 4, the system 100 for analyzing abnormal behavior using data imaging according to an embodiment of the present invention may include a data input unit 110, a data processing unit 130, a dataset split unit 150, and a neural network unit 170.

The data input unit 110 may receive, as an input, data to be analyzed from a system to be analyzed, in which the data to be analyzed is related to a state of the system to be analyzed.

In an example, the system to be analyzed may be various systems including network systems, measurement systems, control systems, and so on.

The data to be analyzed may be collected or generated in the system to be analyzed and transmitted to the data input unit 110 in the form of a packet data stream. For example, as the data to be analyzed, sensor data transmitted from a sensor installed in the system to be analyzed may be transmitted in the form of a packet data stream. Further, the data to be analyzed may be packet data exchanged within the system to be analyzed or exchanged between the system to be analyzed and an external system.

The data to be analyzed may be multi-channel packet data inputted through multiple channels. Of course, the data to be analyzed may also be single-channel packet data inputted through a single channel.

The data processing unit 130 may receive the data to be analyzed as an input and convert the inputted data into image data.

When the data to be analyzed is the multi-channel packet data, the data processing unit 130 may convert the data to be analyzed into grayscale image data. In addition, the data processing unit 130 may additionally generate Fourier image data by Fourier-transforming the grayscale image data.

Meanwhile, when the data to be analyzed is the single channel packet data, the data processing unit 130 may convert the data to be analyzed into spectrogram image data.

The operation at the data processing unit 130 of converting the data to be analyzed into the image data will be described in detail below.

The dataset split unit 150 may classify the image data converted from the data to be analyzed at the data processing unit 130, into datasets (training pairs, verification pairs, test pairs) required for training at the neural network unit 170. The training data classified at the dataset split unit 150 may be inputted to the neural network unit 170 as training data.

The neural network unit 170 receives, as training data, the image data converted from the data to be analyzed, and may be trained so as to classify and predict abnormal behavior in the system to be analyzed. To this end, the neural network unit 170 may utilize neural network algorithms applying various deep learning techniques, such as inception module-based Convolutional Neural networks (CNN) with good performance in image recognition, Deep Neural Networks (DNN), Recurrent Neural Network (RNN), restricted Boltzmann machine, Deep Belief Network (DBN), Deep Q-Network, and the like.

After completing training, the neural network unit 170 may classify the inputted image data converted from the data to be analyzed, and classify and predict abnormal behavior in the system to be analyzed based on the classification result. Depending on embodiments, it is of course possible to implement the neural network unit 170 such that, after completing training, the neural network unit 170 may perform only the function of classifying the image data converted from the data to be analyzed and inputted, while the classification and prediction of abnormal behavior in the system to be analyzed may be performed at a service application linked with the neural network unit 170.

Figure 5:
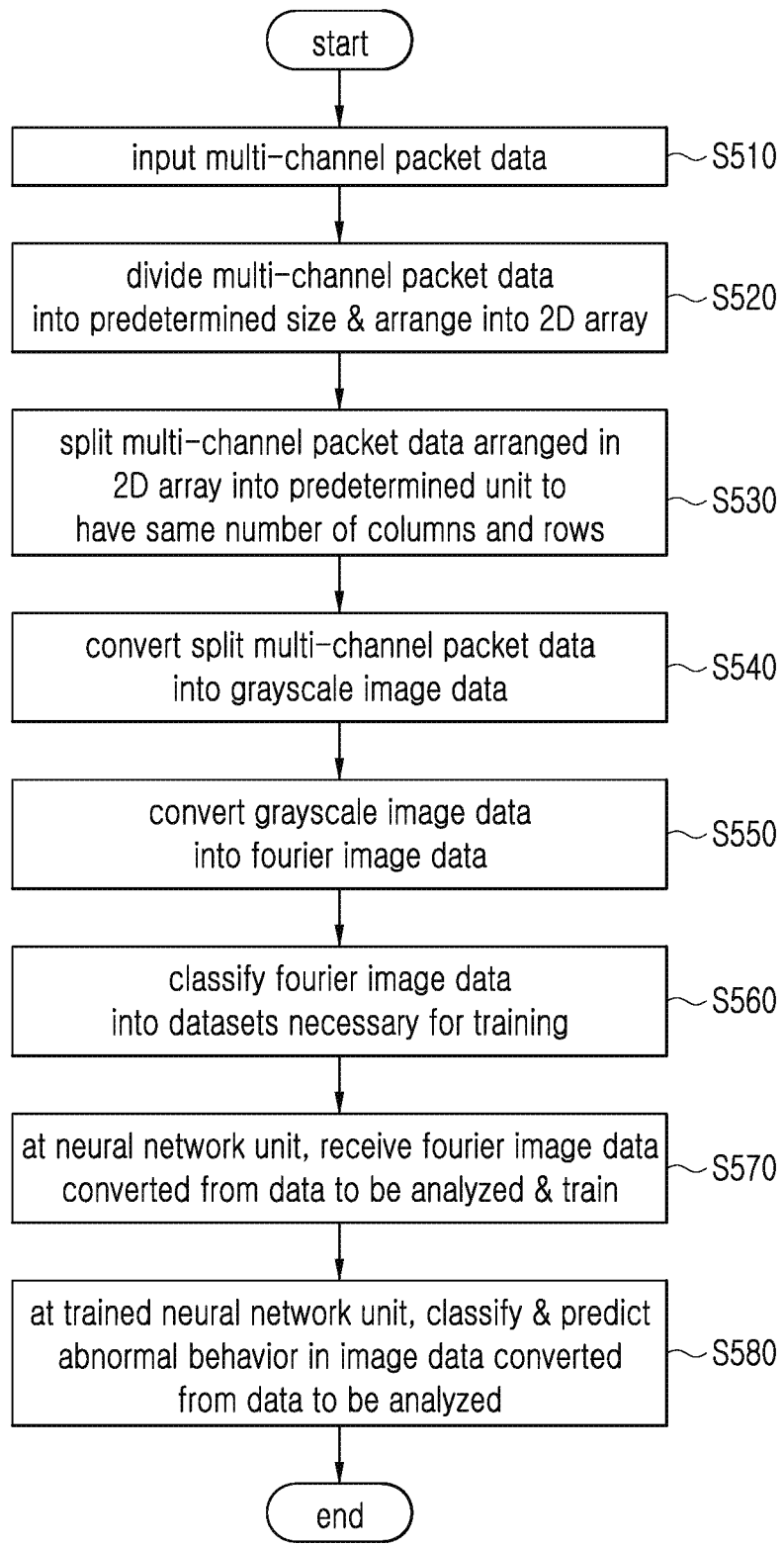
FIG. 5 is a flowchart provided to explain a method of analyzing abnormal behavior using data imaging according to the first embodiment of the present invention.
Figure 6:
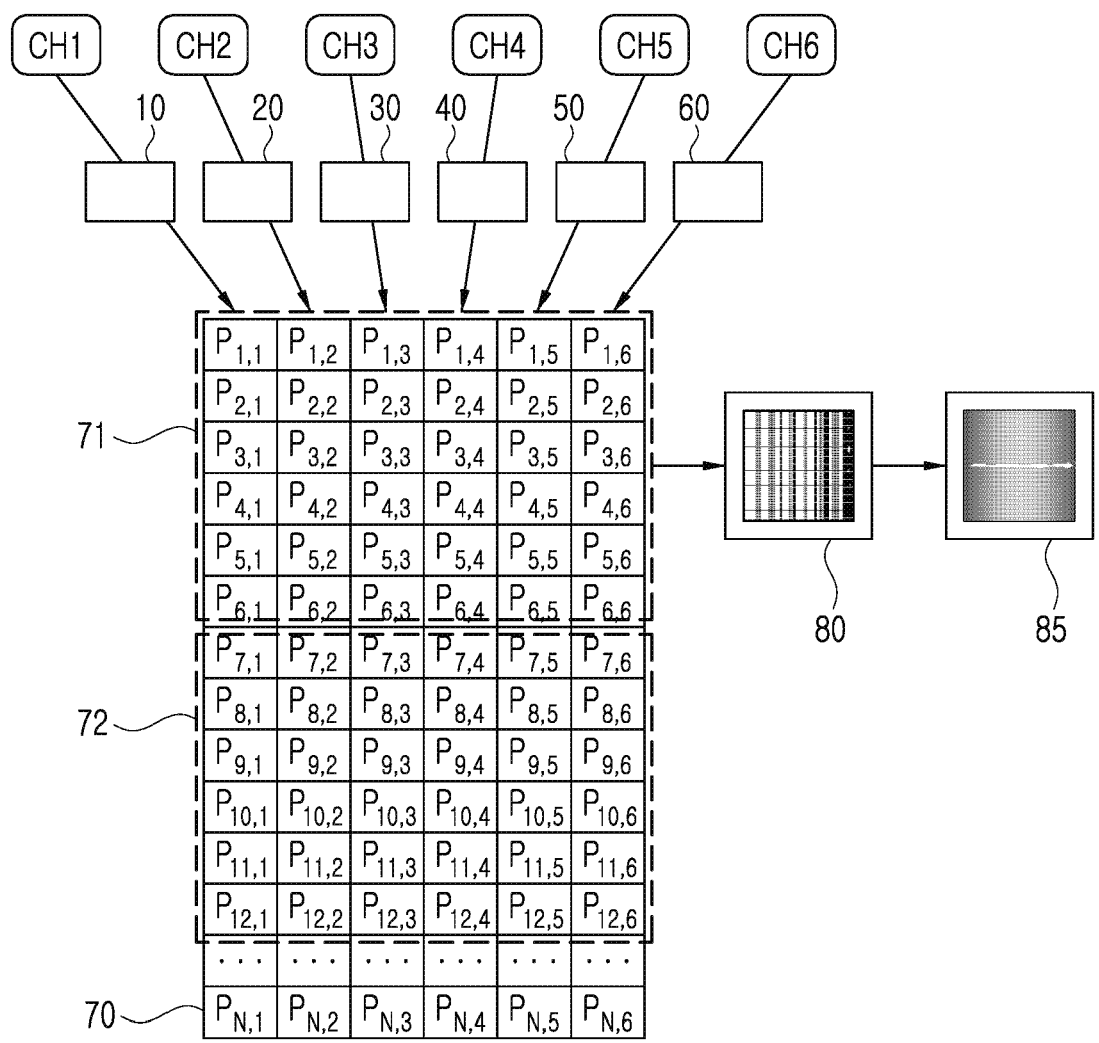
FIG. 6 is a diagram provided to explain a process of preprocessing multi-channel packet data into image data according to the first embodiment of the present invention.

FIG. 5 is a flowchart provided to explain a method of analyzing abnormal behavior using data imaging according to the first embodiment of the present invention, and FIG. 6 is a diagram provided to explain a process of preprocessing multi-channel packet data into image data according to the first embodiment of the present invention.

Referring to FIGS. 4 to 6, the data input unit 110 may first receive multi-channel packet data inputted through multiple channels, at S510.

FIG. 6 illustrates the data input unit 110 receiving an input of packet data 10, 20, 30, 40, 50, and 60 through six channels CH1, CH2, CH3, CH4, CH5, and CH6. The packet data inputted through each channel may be the packet data encrypted by an unknown protocol.

The data processing unit 130 may receive the multi-channel packet data from the data input unit 110, divide the multi-channel packet data into a predetermined size, e.g., 1 byte size, and arrange the data in two-dimensional array, at S520.

When the packet data is divided into 1 byte size, there is an advantage that the data can be treated as one pixel of the grayscale image representing the brightness value in 256 steps. Depending on embodiments, it is also possible to divide the packet data into less than 1 byte, or alternatively, greater than 1 byte.

Meanwhile, as illustrated in FIG. 6, data ($P_{1,1}$, $P_{2,1}$, $P_{3,1}$, $P_{4,1}$, ..., $P_{N,1}$) obtained by dividing the packet data 10 corresponding to channel 1 (CH1) into a byte size may be arranged in the first column. Likewise, the packet data 20, 30, 40, 50, and 60 corresponding to channels 2 to 6 (CH2 to CH6) may be divided into a byte size and arranged in the columns corresponding to the respective channels, and thereby, the data 70 may be generated, in which the multi-channel packet data are arranged in two-dimensional array.

Next, the data processing unit 130 may split the multi-channel packet data 70 arranged in the two-dimensional array into a predetermined unit, at S530. At S530, the data processing unit 130 may split the multi-channel packet data 70 arranged in two-dimensional array so that a number of rows and the number of columns are equal to a number of channels. That is, the multi-channel packet data 71 and 72, which are split at S530, may be split into a square matrix having the equal row and column sizes. In FIG. 6, since a number of channels is 6, the multi-channel packet data is split such that a size of the matrix is 6×6.

Then, the data processing unit 130 may convert the multi-channel packet data 71 and 72 split at S530 into a grayscale image data 80, at S540. Since the packet data is divided into 1 byte size at S520, it may be converted into the grayscale image data 80 representing 256 steps with respect to the brightness value of each pixel, as illustrated in FIG. 6.

Meanwhile, according to an embodiment, the data processing unit 130 may additionally perform Fourier transformation with respect to the grayscale image data 80, which is converted at S540, so that the Fourier image data 85 may be generated at S550, as illustrated in FIG. 6.

FIG. 7 is a diagram provided to compare grayscale image data and Fourier-transformed image data according to the first embodiment of the present invention.

FIG. 7(a) shows an example in which normal packet data is converted into grayscale image data. FIG. 7(b) shows an example in which abnormal packet data is converted into grayscale image data. FIG. 7(c) shows Fourier image data obtained by Fourier-transforming the grayscale image of FIG. 7(a). FIG. 7(d) is Fourier image data obtained by Fourier-transforming the grayscale image of FIG. 7(b).

It can be seen that, compared to the grayscale image data illustrated in FIGS. 7(a) and 7(b), the Fourier image data illustrated in FIGS. 7(c) and 7(d) are easier to distinguish geometrically in both the normal state and the abnormal state and better represent the features that are important for the image analysis. This is because the Fourier image data expresses the image data as frequency information rather than spatial information.

Referring back to FIG. 5, the dataset split unit 150 may classify the Fourier image data converted from the data to be analyzed at the data processing unit 130, into datasets (training pairs, verification pairs, tests pairs) required for training at the neural network unit 170, at S560.

Further, the neural network unit 170 may receive, as training data, the Fourier image data transformed from the data to be analyzed and be trained so as to classify and predict abnormal behavior in the system to be analyzed, at S570.

Depending on embodiments, the operation at S550 of converting the grayscale image data into Fourier image data may be omitted, and the operations at S560 and S570 may be performed with respect to the grayscale image data converted from the data to be analyzed.

After completing training, the neural network unit 170 may classify the inputted grayscale image data or Fourier image data converted from the data to be analyzed, and classify and predict abnormal behavior in the system to be analyzed based on the classification result, at S580. As described above, it is also possible to implement the neural network unit 170 such that, after completing training, the neural network unit 170 may perform only the function of classifying the image data converted from the data to be analyzed and inputted, while the classification and prediction of abnormal behavior in the system to be analyzed may be performed at a service application linked with the neural network unit 170.

Figure 8:
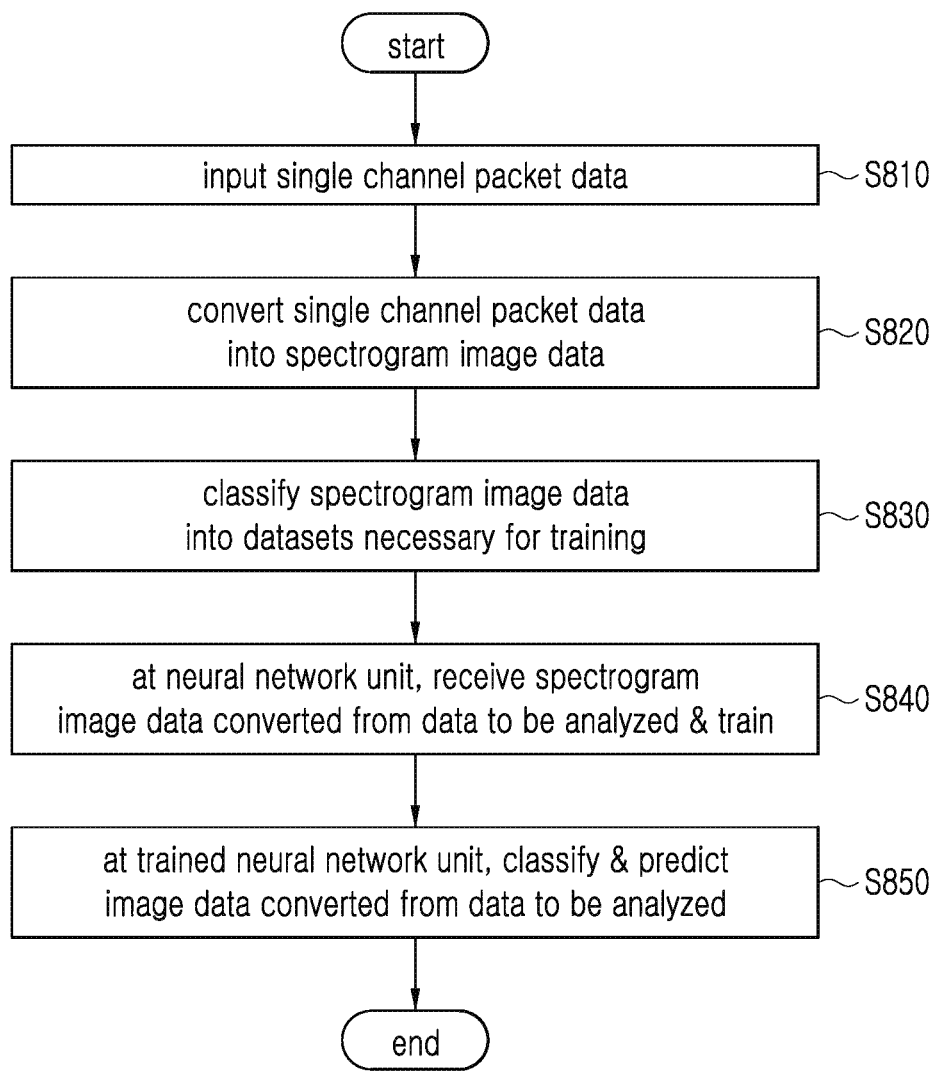
FIG. 8 is a flowchart provided to explain a method of analyzing abnormal behavior using data imaging according to a second embodiment of the present invention.
Figure 9:
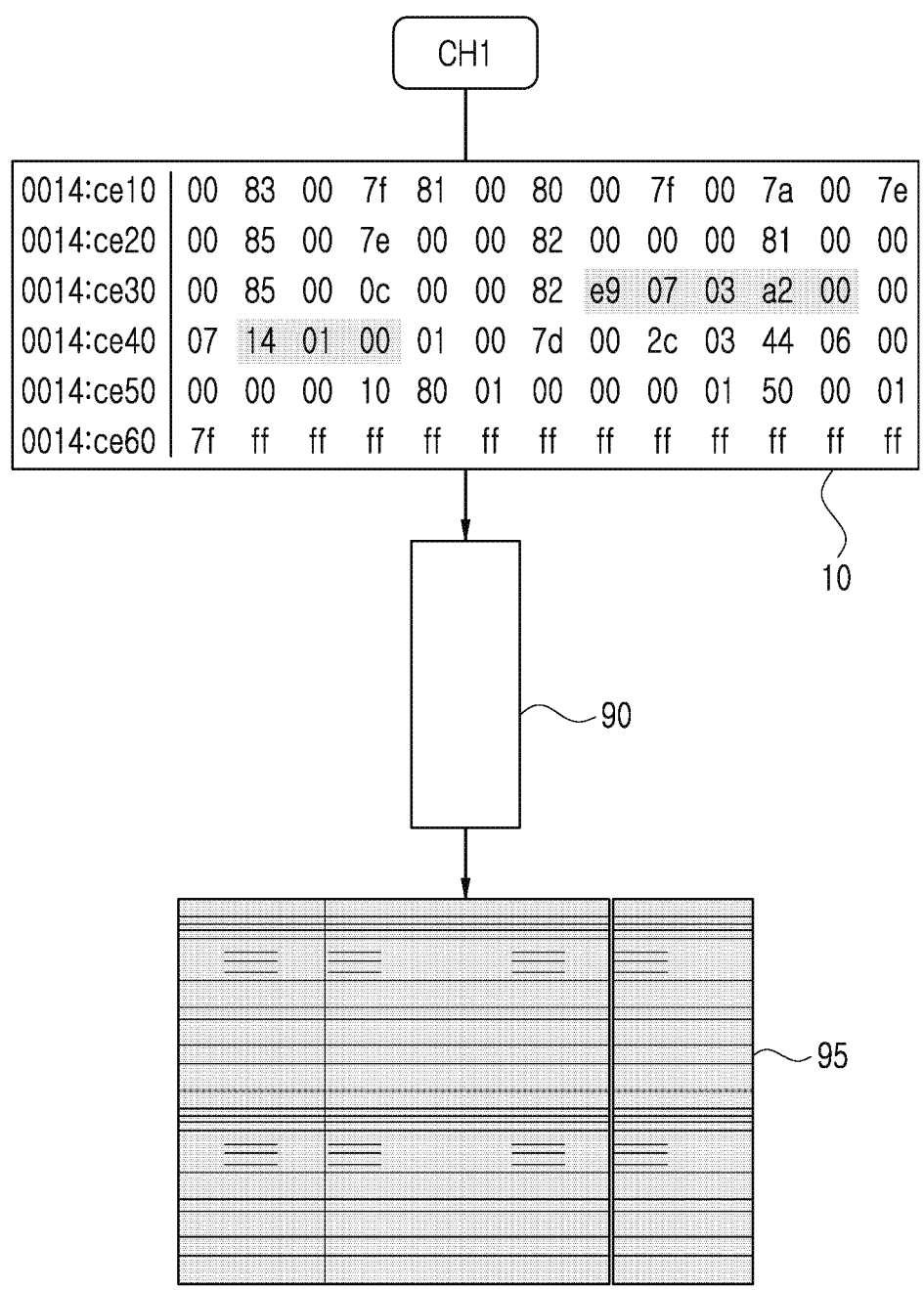
FIG. 9 is a diagram provided to explain a process of preprocessing single channel packet data into image data according to the second embodiment of the present invention.

FIG. 8 is a flowchart provided to explain a method of analyzing abnormal behavior using data imaging according to a second embodiment of the present invention, and FIG. 9 is a diagram provided to explain a process of preprocessing single channel packet data into image data according to the second embodiment of the present invention.

Referring to FIGS. 4, 8, and 9, the data input unit 110 may first receive single channel packet data inputted through a single channel, at S810.

FIG. 9 illustrates the data input unit 110 receiving an input of packet data 10 through one channel CH1. The packet data 10 may be packet data encrypted by an unknown protocol.

The data processing unit 130 may receive the single channel packet data 70 from the data input unit 110, and divide the data into a predetermined unit to convert the data into spectrogram image data 95, at S820.

To describe the operation at S820 in more detail, the single-channel packet data transmitted from the data input unit 110 is divided into a predetermined unit, and the single channel packet data divided into a predetermined unit is treated as uncompressed pulse code modulation (PCM) audio data such that the packet data may be converted into data 90 in audio file format by adding a 'way' audio header to the front thereof. Further, the data 90 converted into audio file format may then be converted into spectrogram image data 95.

At S820, the predetermined unit for dividing the single channel packet data may be selected from the sizes suitable for training at the neural network unit 170.

Referring back to FIG. 8, the dataset split unit 150 may classify the spectrogram image data converted from the data to be analyzed at S820 as datasets (training pairs, verification pairs, and test pairs) required for training at the neural network unit 170, at S830.

Next, the neural network unit 170 receives as training data the spectrogram image data converted from the data to be analyzed, and performs the training so as to classify and predict abnormal behavior in the system to be analyzed, at S840.

After completing training, the neural network unit 170 may classify the inputted spectrogram image data converted from the data to be analyzed, and classify and predict abnormal behavior in the system to be analyzed based on the classification result, at S850.

The embodiments of the present invention include a computer-readable medium including program instructions for performing various computer implemented operations. The medium stores a program for executing the method of analyzing abnormal behavior in a deep learning-based system by using data imaging described above. The medium may include program instructions, data files, data structures, and so on, singularly or in combination. Examples of such medium include magnetic medium such as hard disks, floppy disks and magnetic tapes, optical recording medium such as CD and DVD, floptical disk and magneto-optical medium, and hardware devices configured to store and execute program instructions such as ROM, RAM, flash memory, and so on. Examples of program instructions include high-level language codes that may be executed by a computer using an interpreter, and so on as well as machine language codes such as those generated by a compiler.

Although the present invention has been described in detail, it should be understood that the detailed description and specific examples, while indicating preferred embodiments of the disclosure, are given by way of illustration only, since various changes and modifications within the scope of the disclosure will become apparent to those skilled in the art from this detailed description.

The invention claimed is:

1. A method of analyzing abnormal behavior by using data imaging, comprising:
   a step of receiving data to be analyzed as an input, wherein the data to be analyzed is related to a state of a system to be analyzed;

a step of converting the inputted data to be analyzed into image data;
a step of training a neural network unit with the converted image data as an input; and
at the neural network unit, which has received the image data converted from the data to be analyzed as the input and completed training, a step of detecting or predicting abnormal behavior in the system to be analyzed,
wherein the neural network unit trained and performs classification of the image data converted from the data to be analyzed, by using a neural network algorithm applied with a deep learning technique.

2. The method of claim 1, wherein the data to be analyzed is multi-channel packet data inputted from multiple channels, and
the step of converting the inputted data to be analyzed into image data comprises:
dividing the multi-channel packet data into a predetermined size and arranging the same in a two-dimensional array;
splitting the multi-channel packet data arranged in the two-dimensional array into a predetermined unit; and
converting the split multi-channel packet data into grayscale image data.

3. The method of claim 2, wherein the split multi-channel packet data has the same number of columns and rows as the number of channels.

4. The method of claim 3, wherein the predetermined size is a byte.

5. The method of claim 2, wherein the step of converting the inputted data to be analyzed into image data further comprises Fourier-transforming the grayscale image data to generate Fourier image data.

6. The method of claim 1, wherein the data to be analyzed is single-channel packet data, and
the step of preprocessing the inputted data to be analyzed comprises:
converting the single-channel packet data into an audio file; and
converting the converted audio file into spectrogram image data.

7. A system for analyzing abnormal behavior by using data imaging, comprising:
an input unit that receives data to be analyzed as an input, wherein the data to be analyzed is related to a state of a system to be analyzed;
a data processing unit that converts the inputted data to be analyzed into image data; and
a neural network unit that receives the converted image data for training, and after completing the training, receives the image data converted from the data to be analyzed to detect abnormal behavior in the system to be analyzed,
wherein the neural network unit performs the training and classification of the image data converted from the data to be analyzed, by using a neural network algorithm applied with a deep learning technique.

8. The system of claim 7, wherein the data to be analyzed is single-channel packet data, and
the data processing unit converts the single channel packet data into an audio file and converts the converted audio file into spectrogram image data.

9. The system of claim 7, wherein the data to be analyzed is multi-channel packet data inputted from multiple channels, and
the data processing unit divides the multi-channel packet data into a predetermined size and arranges the same in a two-dimensional array, splits the multi-channel packet data arranged in the two-dimensional array into a predetermined unit, and converts the split multi-channel packet data into grayscale image data.

10. The system of claim 9, wherein the split multi-channel packet data has the same number of columns and rows as the number of channels.

11. The system of claim 10, wherein the predetermined size is a byte.

12. The system of claim 9, wherein the data processing unit Fourier-transforms the grayscale image data to generate Fourier image data.

* * * * *